US008911516B2

(12) United States Patent
Grabarse et al.

(10) Patent No.: US 8,911,516 B2
(45) Date of Patent: Dec. 16, 2014

(54) QUATERNIZED COPOLYMER

(75) Inventors: Wolfgang Grabarse, Mannheim (DE); Hannah Maria Koenig, Mannheim (DE); Christian Tock, Alzingen (LU); Cornelia Roeger-Goepfert, Schwetzingen (DE); Ludwig Voelkel, Limburgerhof (DE); Harald Boehnke, Mannheim (DE)

(73) Assignee: Basf SE, Ludwigshafen (DE)

( * ) Notice: Subject to any disclaimer, the term of this patent is extended or adjusted under 35 U.S.C. 154(b) by 454 days.

(21) Appl. No.: 13/168,405

(22) Filed: Jun. 24, 2011

(65) Prior Publication Data

US 2011/0315107 A1  Dec. 29, 2011

Related U.S. Application Data

(60) Provisional application No. 61/358,434, filed on Jun. 25, 2010.

(51) Int. Cl.
| | | |
|---|---|---|
| C10L 1/22 | (2006.01) | |
| C08F 222/06 | (2006.01) | |
| C10L 1/236 | (2006.01) | |
| C10L 10/08 | (2006.01) | |
| C10L 10/18 | (2006.01) | |
| C10L 10/04 | (2006.01) | |

(52) U.S. Cl.
CPC ............ *C08F 222/06* (2013.01); *C10L 1/2364* (2013.01); *C10L 10/08* (2013.01); *C10L 10/18* (2013.01); *C10L 10/04* (2013.01); *C10L 1/2366* (2013.01)
USPC ......... 44/393; 44/422; 525/326.1; 525/327.6; 525/328.9; 525/329.4; 525/329.9; 525/333.7; 525/379; 525/380; 525/382; 525/383; 525/385; 525/386; 526/317.1; 526/318.2; 526/318.25; 526/318.3; 526/318.6

(58) Field of Classification Search
USPC ............ 44/393, 422; 525/326.1, 327.6, 328.9, 525/329.4, 329.9, 333.7, 379, 380, 382, 525/383, 385, 386; 526/317.1, 318.2, 526/318.25, 318.3, 318.6
See application file for complete search history.

(56) References Cited

U.S. PATENT DOCUMENTS

| | | | |
|---|---|---|---|
| 4,491,455 A | 1/1985 | Ishizaki et al. | |
| 4,839,415 A | 6/1989 | Schürmann et al. | |
| 4,877,416 A | 10/1989 | Campbell | |
| 5,766,273 A | 6/1998 | Dralle-Voss et al. | |
| 6,743,266 B2 | 6/2004 | DeRosa et al. | |
| 2010/0006049 A1 | 1/2010 | Jung et al. | |
| 2011/0048354 A1 | 3/2011 | Hollingshurst | |
| 2012/0138004 A1 * | 6/2012 | Stevenson et al. ............ 123/1 A |

FOREIGN PATENT DOCUMENTS

| | | |
|---|---|---|
| DE | 38 26 608 A 1 | 2/1990 |
| DE | 38 38 918 A 1 | 5/1990 |
| DE | 41 42 241 A 1 | 6/1993 |
| DE | 43 09 074 A 1 | 9/1994 |
| DE | 196 20 262 A 1 | 11/1997 |
| DE | 101 02 913 A 1 | 7/2002 |
| EP | 0 061 895 A2 | 10/1982 |
| EP | 0 244 616 A2 | 11/1987 |
| EP | 0 245 674 A1 | 11/1987 |
| EP | 0 261 957 A2 | 3/1988 |
| EP | 0 307 815 A1 | 3/1989 |
| EP | 0 310 875 A1 | 4/1989 |
| EP | 0 356 725 A1 | 3/1990 |
| EP | 0 452 328 | 10/1991 |
| EP | 0 476 485 A1 | 3/1992 |
| EP | 0 548 617 A2 | 6/1993 |
| EP | 0 639 632 A1 | 2/1995 |
| EP | 0 700 985 A1 | 3/1996 |
| EP | 0 831 141 A1 | 3/1998 |
| EP | 1 887 074 A1 | 2/2008 |
| WO | WO 87/01126 | 2/1987 |
| WO | WO 91/03529 | 3/1991 |
| WO | WO 93/18115 | 9/1993 |
| WO | WO 94/24231 | 10/1994 |
| WO | WO 96/03367 | 2/1996 |
| WO | WO 96/03479 A1 | 2/1996 |
| WO | WO 97/03946 | 2/1997 |
| WO | WO 98/04656 | 2/1998 |

(Continued)

OTHER PUBLICATIONS

U.S. Appl. No. 13/315,468, filed Dec. 9, 2011, Boehnke.

(Continued)

*Primary Examiner* — Cephia D Toomer
(74) *Attorney, Agent, or Firm* — Oblon, Spivak, McClelland, Maier & Neustadt, L.L.P.

(57) ABSTRACT

A quaternized copolymer obtainable by: (A) copolymerization of straight-chain, branched or cyclic, ethylenically unsaturated $C_2$ to $C_{100}$ hydrocarbons, which may bear oxygen- or nitrogen-functional substituents which cannot be reacted with amines to give amides or imides or with alcohols to give esters, with ethylenically unsaturated $C_3$- to $C_{12}$-mono- or dicarboxylic acids or acid derivatives, which can be reacted with amines to give amides or imides or with alcohols to give esters, to give a copolymer with a number-average molecular weight of 500 to 20 000; (B) partial or full amidation or imidation or esterification of the carboxylic acid functions by reacting them with oligoamines having 2 to 6 nitrogen atoms or alcoholamines, each of which comprises primary or secondary nitrogen atom or a hydroxyl group and a quaternizable tertiary nitrogen atom; (C) partial or full quaternization of the tertiary nitrogen atom with a quaternizing agent. The quaternized copolymer thus prepared is suitable as a fuel additive in direct-injection diesel engines.

13 Claims, No Drawings

(56) References Cited

FOREIGN PATENT DOCUMENTS

| WO | WO9916851 | * | 4/1999 |
| WO | WO 99/29748 | | 6/1999 |
| WO | WO 00/44857 | | 8/2000 |
| WO | WO 00/47698 | | 8/2000 |
| WO | WO 02/092645 A1 | | 11/2002 |
| WO | WO 2004/035715 A1 | | 4/2004 |
| WO | WO 2005/054314 A2 | | 6/2005 |
| WO | WO 2006/100083 A1 | | 9/2006 |
| WO | WO 2006/135881 A2 | | 12/2006 |
| WO | WO 2009/140190 A1 | | 11/2009 |

OTHER PUBLICATIONS

U.S. Appl. No. 13/307,392, filed Nov. 30, 2011, Voelkel, et al.
U.S. Appl. No. 13/313,400, filed Dec. 7, 2011, Lange, et al.
U.S. Appl. No. 13/668,985, filed Nov. 5, 2012, Hansch, et al.
U.S. Appl. No. 13/761,644, filed Feb. 7, 2013, Peretolchin, et al.
U.S. Appl. No. 13/781,929, filed Mar. 1, 2013, Strittmatter, et al.
U.S. Appl. No. 13/898,766, filed May 21, 2013, Peretolchin, et al.
U.S. Appl. No. 13/535,847, filed Jun. 28, 2012, Roeger-Goepfert, et al.
U.S. Appl. No. 13/177,042, filed Jul. 6, 2011, Grabarse, et al.
U.S. Appl. No. 13/712,297, filed Dec. 12, 2012, Hansch, et al.
U.S. Appl. No. 13/783,708, filed Mar. 4, 2013, Strittmatter, et al.
International Search Report mailed Oct. 7, 2011, in PCT/EP2011/060429, filed Jun. 22, 2011.
U.S. Appl. No. 13/866,291, filed Apr. 19, 2013, Boehnke.
U.S. Appl. No. 13/407,422, filed Feb. 28, 2012, Boehnke.

* cited by examiner

QUATERNIZED COPOLYMER

The present invention relates to a quaternized copolymer which by the reaction steps of
(A) copolymerization of one or more straight-chain, branched or cyclic, ethylenically unsaturated $C_2$ to $C_{100}$ hydrocarbons (monomer M1), which may bear one or more oxygen- or nitrogen-functional substituents which cannot be reacted with amines to give amides or imides or with alcohols to give esters, with one or more ethylenically unsaturated $C_3$- to $C_{12}$-carboxylic acids or $C_3$- to $C_{12}$-carboxylic acid derivatives (monomer M2), which bear one or two carboxylic acid functions and can be reacted with amines to give amides or imides or with alcohols to give esters, to give a copolymer (CP) with a number-average molecular weight $M_n$ of 500 to 20 000;
(B) partial or full amidation or imidation or esterification of the carboxylic acid functions of the (M2) units in the copolymer (CP) by reacting them with one or more oligoamines (OA) having 2 to 6 nitrogen atoms or alcoholamines (AA), each of which comprises at least one primary or secondary nitrogen atom or at least one hydroxyl group and at least one quaternizable tertiary nitrogen atom;
(C) partial or full quaternization of the at least one tertiary nitrogen atom in the OA or AA units with at least one quaternizing agent (QM);
where the sequence of steps (B) and (C) may also be reversed, such that the partial or full amidation or imidation of esterification of the carboxylic acid functions of the (M2) units in the copolymer (CP) can be effected by reacting with the oligoamines (OA) or alcoholamines (AA) already quaternized in reaction step (C).

The present invention further relates to a process for preparing such a quaternized copolymer.

The present invention also relates to fuels having a content of such a quaternized copolymer.

The present invention further relates to the use of this quaternized copolymer as a fuel additive for reducing or preventing deposits in the injection systems of direct-injection diesel engines, especially in common-rail injection systems, for reducing fuel consumption in direct-injection diesel engines, especially in diesel engines with common-rail injection systems, and for minimizing power loss in direct-injection diesel engines, especially in diesel engines with common-rail injection systems.

In direct-injection diesel engines, the fuel is injected and distributed ultrafinely (nebulized) by a multihole injection nozzle which reaches directly into the combustion chamber in the engine, instead of being introduced into a prechamber or swirl chamber as in the case of the conventional (chamber) diesel engine. The advantage of the direct-injection diesel engines lies in their high performance for diesel engines and a nevertheless low fuel consumption. Moreover, these engines achieve a very high torque even at low speeds.

At present, essentially three methods are being used to inject the fuel directly into the combustion chamber of the diesel engine: the conventional distributor injection pump, the pump-nozzle system (unit-injector system or unit-pump system) and the common-rail system.

In the common-rail system, the diesel fuel is conveyed by a pump with pressures up to 2000 bar into a high-pressure line, the common rail. Proceeding from the common rail, branch lines run to the different injectors which inject the fuel directly into the combustion chamber. The full pressure is always applied to the common rail, which enables multiple injection or a specific injection form. In the other injection systems, in contrast, only one injection is possible. The injection in the common rail is divided essentially into three groups: (1.) pre-injection, by which essentially softer combustion is achieved, such that hard combustion noises ("nailing") are reduced and the engine appears to run quietly; (2.) main injection, which is responsible especially for a good torque profile; and (3.) post-injection, which especially ensures a low $NO_x$ value. In this post-injection, the fuel is generally not combusted, but instead evaporated by residual heat in the cylinder. The exhaust gas/fuel mixture formed is transported to the exhaust gas system, where the fuel, in the presence of suitable catalysts, acts as a reducing agent for the nitrogen oxides $NO_x$.

The variable, cylinder-individual injection in the common-rail injection system can positively influence the pollutant emission of the engine, for example the emission of nitrogen oxides ($NO_x$), carbon monoxide (CO) and especially of particulates (soot). This makes it possible, for example, that engines equipped with common-rail injection systems can meet the Euro 4 standard theoretically even without additional particulate filters.

In modern common-rail diesel engines, under particular conditions, for example when biodiesel-containing fuels or fuels with metal impurities such as zinc compounds are used, deposits can form on the injector orifices, which adversely affect the injection performance of the fuel and hence impair the performance of the engine, i.e. especially reduce the power, but in some cases also worsen the combustion. The formation of deposits is enhanced further by further developments of the injector construction, especially by the change in the geometry of the nozzles (narrower, conical orifices with rounded outlet). For lasting optimal functioning of engine and injectors, such deposits in the nozzle orifices must be prevented or reduced by suitable fuel additives.

It was therefore an object of the present invention to provide fuel additives which remedy the shortcomings outlined above, i.e. more particularly prevent or reduce deposits in the injection systems, in particular in the injectors, of direct-injection diesel engines, reduce fuel consumption in direct-injection diesel engines and minimize power losses in such engines.

The prior art discloses $C_8$- to $C_{200}$-alkyl- or -alkenylsuccinimides as detergent additives for fuels such as middle distillate fuels and gasoline fuels. For instance, WO 02/092645 (1) describes polyalkenylsuccinimides such as polyisobutenylsuccinimides as additives to fuels such as diesel fuel, heating oil or gasoline fuel, or to lubricants, which— obviously as a result of the preparation—may comprise up to 30% by weight of the corresponding polyalkenylsuccinamides succinic monoamides. These polyalkenylsuccinimides are said to counteract engine deposits and deposits on the injection nozzles.

WO 2006/100083 (2) discloses that particular detergent additives reduce the amount of particulates in the exhaust gas emissions of direct-injection diesel engines such as diesel engines with common-rail injection systems. Detergent additives include additives comprising moieties which are derived from succinic anhydride and have hydroxyl and/or amino and/or amido and/or imido groups, such as the corresponding derivatives of polyisobutenylsuccinic anhydride, especially derivatives with aliphatic polyamines. The moieties with hydroxyl and/or amino and/or amido and/or imido groups are, for example, carboxylic acid groups, acid amides of monoamines, acid amides of di- or polyamines, which still have free amino groups as well as the amide function, succinic acid derivatives with one acid and one amide function, carboximides with monoamines, carboximides with di- or polyamines, which still have free amine groups as well as the imide function, or diimides which are formed by reaction of di- or polyamines with two succinic acid derivatives.

EP 1 887 074 A1 (3) describes a process for removing or reducing injector deposits in diesel engines using reaction products between a hydrocarbyl-substituted succinic acid or anhydride thereof, for example polyisobutenylsuccinic anhydride, and hydrazine. Among these reaction products, monohydrazide structures are also mentioned.

WO 2006/135881 (4) describes the condensation of hydrocarbyl-substituted acylating agents, which are obtainable by ene reaction of olefins with maleic anhydride, with amines having an additional tertiary amino group and subsequent quaternization of the tertiary amino group to give quaternary ammonium salts, which are suitable as fuel additives for cleaning and keeping clean intake systems of internal combustion engines.

The above-described $C_8$-$C_{200}$-alkyl- or -alkenylsuccinimides which are known from the prior art and frequently used in practice, such as polyisobutenylsuccinimides and related systems, are capable of achieving the specific object outlined only to an insufficient degree; however, the additional use thereof in the present invention as further fuel additives in a minor amount is not harmful.

This object is achieved by the use of the quaternized copolymer cited at the outset, which is obtainably by reaction steps (A), (B) and (C).

The present application also provides a process for preparing a quaternized copolymer, which comprises performing the following reaction steps:
(A) copolymerization of one or more straight-chain, branched or cyclic, ethylenically unsaturated $C_2$ to $C_{100}$ hydrocarbons (monomer M1), which may bear one or more oxygen- or nitrogen-functional substituents which cannot be reacted with amines to give amides or imides or with alcohols to give esters, with one or more ethylenically unsaturated $C_3$- to $C_{12}$-carboxylic acids or $C_3$- to $C_{12}$-carboxylic acid derivatives (monomer M2), which bear one or two carboxylic acid functions and can be reacted with amines to give amides or imides or with alcohols to give esters, to give a copolymer (CP) with a number-average molecular weight $M_n$ of 500 to 20 000;
(B) partial or full amidation or imidation or esterification of the carboxylic acid functions of the (M2) units in the copolymer (CP) by reacting them with one or more oligoamines (OA) having 2 to 6 nitrogen atoms or alcoholamines (AA), each of which comprises at least one primary or secondary nitrogen atom or at least one hydroxyl group and at least one quaternizable tertiary nitrogen atom;
(C) partial or full quaternization of the at least one tertiary nitrogen atom in the OA or AA units with at least one quaternizing agent (QM);
where the sequence of steps (B) and (C) may also be reversed, such that the partial or full amidation or imidation of esterification of the carboxylic acid functions of the (M2) units in the copolymer (CP) can be effected by reacting with the oligoamines (OA) or alcoholamines (AA) already quaternized in reaction step (C).

The copolymer (CP) obtained in reaction step (A) is known in principle from EP-A 307 815 (6). The use of the copolymer (CP) in the form of the alkali metal or alkaline earth metal salts is recommended therein for prevention or reduction of wear phenomena on the valves of gasoline engines and for simultaneous reduction of corrosion in gasoline engines.

Examples of optional oxygen- or nitrogen-functional substitutes which may occur in the monomers (M1) in reaction step (A) are ether oxygen atoms or carboxamide moieties.

In a preferred embodiment, the monomers (M1) in reaction step (A) are selected from $C_2$- to $C_{40}$-alkenes, $C_3$- to $C_{10}$-cycloolefins, alkyl vinyl ethers having 1 to 30 carbon atoms in the alkyl group, cycloalkyl vinyl ethers having 3 to 10 carbon atoms in the alkyl group and oligo- or polyisobutenes having 8 to 96 carbon atoms.

Examples of very suitable straight-chain or branched $C_2$- to $C_{40}$-alkenes are ethylene, propylene, butene-1, isobutene, pentene-1,3-methylbutene-1, hexene-1,4-methyl-pentene-1, 3,3-dimethylbutene-1, heptene-1,4-methylhexene-1,5-methylhexene-1,4,4-dimethylpentene-1, octene-1,2,4,4-trimethylpentene-1,2,4,4-trimethylpentene-2, isomer mixture of 2,4,4-trimethylpentene-1 and 2,4,4-trimethylpentene-2 ("diisobutene"), 4,4-dimethylhexene-1, decene-1, dodecene-1, tetradecene-1, hexadecene-1, octadecene-1, $C_{20}$-olefin-1, $C_{22}$-olefin-1, $C_{24}$-olefin-1, $C_{26}$-olefin-1, $C_{28}$-olefin-1, $C_{30}$-olefin-1, $C_{40}$-olefin-1, $C_{20-24}$-olefin-1, $C_{22/24}$-olefin-1, $C_{24-28}$-olefin-1, and mixtures of the alkenes mentioned with one another. Among these, preference is given to straight-chain or branched $C_{12}$- to $C_{30}$-alkenes, especially straight-chain or branched $C_{16}$- to $C_{26}$-alkenes, in particular straight-chain or branched $C_{20}$- to $C_{24}$-alkenes.

Examples of very suitable $C_3$- to $C_{10}$-cycloolefins are cyclobutene, cyclopentene, cyclohexene, cycloheptene and cyclooctene, and mixtures of the cycloolefins mentioned with one another. Among these, cyclopentene and cyclohexene are preferred.

Examples of very suitable alkyl vinyl ethers having 1 to 30 carbon atoms in the straight-chain or branched alkyl group are methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, 2-methylpentyl vinyl ether, n-heptyl vinyl ether, n-octyl vinyl ether, 2-ethylhexyl vinyl ether, 2,2,4-trimethylpentyl vinyl ether, n-decyl vinyl ether, 2-propylheptyl vinyl ether, n-dodecyl vinyl ether, isododecyl vinyl ether, n-tridecyl vinyl ether, isotridecyl vinyl ether, n-tetradecyl vinyl ether, n-hexadecyl vinyl ether, n-octadecyl vinyl ether, n-eicosyl vinyl ether, n-docosyl vinyl ether, n-tetracosyl vinyl ether, n-hexacosyl vinyl ether, n-octacosyl vinyl ether, oleyl vinyl ether, and mixtures of the alkyl vinyl ethers mentioned with one another. Among these, preference is given to alkyl vinyl ethers with straight-chain or branched $C_8$- to $C_{26}$-alkyl groups, especially straight-chain or branched $C_{12}$- to $C_{24}$-alkyl groups, in particular straight-chain or branched $C_{16}$- to $C_{22}$-alkyl groups.

Examples of very suitable cycloalkyl vinyl ethers having 3 to 10 carbon atoms in the cycloalkyl group are cyclobutyl vinyl ether, cyclopentyl vinyl ether, cyclohexyl vinyl ether, cycloheptyl vinyl ether and cyclooctyl vinyl ether, and mixtures of the cycloalkyl vinyl ethers mentioned with one another. Among these, preference is give to cyclopentyl vinyl ether and cyclohexyl vinyl ether.

Useful oligo- or polyisobutenes having 8 to 96 carbon atoms, especially 44 to 92 carbon atoms, are in particular polyisobutenes with a high content of terminal (α) double bonds, typically of at least 70 mol %, especially of at least 80 mol %, for example those with a number-average molecular weight $M_n$ of 550, 700 or 1000.

In addition to the preferred monomers (M1) mentioned, it is, for example, also possible to use acrylamides or methacrylamides such as N—($C_1$-$C_{30}$-alkyl)acrylamides, N,N-di-($C_1$-$C_{30}$-alkyl)acrylamides, N—($C_1$-$C_{30}$-alkyl)methacrylamides or N,N-di($C_1$-$C_{30}$-alkyl)-methacrylamides as monomers (M1).

The monomers (M1) in reaction step (A) preferably bear the polymerizable ethylenically unsaturated double bond in the α position, i.e. the ethylenically unsaturated double bond is in the terminal position in the form of the structural element >C=H$_2$ in the monomer (M1).

In a preferred embodiment, the monomers (M2) in reaction step (A) are selected from acrylic acid, methacrylic acid, maleic acid, fumaric acid and itaconic acid, and the anhydrides thereof, halides thereof, i.e. the fluorides, chlorides, bromides or iodides thereof, and esters thereof, especially the C$_1$- to C$_{30}$-alkyl esters thereof. Particular preference is given to maleic acid and maleic anhydride.

In addition to the preferred monomers (M2) mentioned, it is, for example, also possible to use crotonic acid, isocrotonic acid, but-1-enecarboxylic acid, pent-1-enecarboxylic acid, hex-1-enecarboxylic acid, hept-1-enecarboxylic acid, oct-1-enecarboxylic acid, non-1-enecarboxylic acid, dec-1-enecarboxylic acid, undec-1-enecarboxylic acid, citraconic acid or mesaconic acid, and the anhydrides thereof, halides thereof, i.e. the fluorides, chlorides, bromides or iodides thereof, and esters thereof, especially the C$_1$- to C$_{30}$-alkyl esters thereof, as monomers (M2).

Typically, the monomer units (M1) and (M2) are present in a weight ratio of 30:70 to 70:30, especially 40:60 to 60:40, in the copolymer (CP) of reaction step (A).

The copolymer (CP) has a number-average molecular weight $M_n$ of 500 to 20 000, especially of 1000 to 18 000, in particular of 4000 to 16 000 (determined in each case by gel permeation chromatography), and generally a polydispersity (quotient of weight-average molecular weight and number-average molecular weight: $PDI=M_w/M_n$) of 1.3 to 10, especially of 1.6 to 5, in particular of 2.0 to 2.5.

The two monomer units (M1) and (M2) are generally present in alternating or random distribution in the copolymer (CP). However, it is possible in principle by particular process regimes known to those skilled in the art also to obtain block copolymers from the monomers (M1) and (M2).

The monomers (M1) and (M2) are generally copolymerized by free-radical means. The copolymerization makes use of known customary polymerization techniques, such as bulk polymerization, suspension polymerization, precipitation polymerization or solution polymerization. It is generally initiated with the customary free-radical initiators, for example with acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), tert-butyl perpivalate, tert-butyl per-2-ethylhexanoate, tert-butyl permaleate, 2,2'-azobis-(isobutyronitrile), bis(tert-butyl peroxide)cyclohexane, tert-butyl peroxyisopropylcarbonate, tert-butyl peracetate, dicumyl peroxide, di-tert-amyl peroxide, di-tert-butyl peroxide, p-methane hydroperoxide, cumene hydroperoxide, tert-butyl hydroperoxide or mixtures of the free-radical initiators mentioned. Typically, these free-radical initiators are used in amounts of 0.1 to 10% by weight, especially 0.2 to 5% by weight, calculated using the total amount of monomers used.

In general, the copolymerization is effected at temperatures of 40 to 250° C., especially 80 to 220° C., appropriately working under pressure when using volatile monomers (M1) with boiling points below the copolymerization temperature. The copolymerization is typically performed with exclusion of air or oxygen, i.e. if it is not possible to work under boiling conditions, inertizing agents such as nitrogen are used, since oxygen retards the copolymerization. The additional use of redox coinitiators, for example benzoin, dimethylaniline, ascorbic acid, and organic-soluble complexes of heavy metals such as copper, cobalt, manganese, iron, nickel and chromium, can accelerate the copolymerization.

To control the molecular weight, especially to obtain a copolymer with relatively low molecular weight, regulators can be used additionally. Suitable regulators are, for example, allyl alcohols and organic mercapto compounds, such as 2-mercaptoethanol, 2-mercaptopropanol, mercaptoacetic acid, mercaptopropionic acid, tert-butyl mercaptan, n-octyl mercaptan, n-dodecyl mercaptan or tert-dodecyl mercaptan, which are typically used in amounts of 0.1 to 10% by weight, based on the total amount of the monomers used.

When the polymerization technique of suspension polymerization, precipitation polymerization or solution polymerization is employed in the preparation of (CP), the use of a suitable inert solvent or solvent mixture is required. Suitable for this purpose are generally—of course always specifically for the particular polymerization technique employed—for example aliphatic and cycloaliphatic hydrocarbons such as pentane, hexane, heptane, octane, isooctane, cyclohexane, methylcyclohexane, ethylcyclohexane, dimethylcyclohexane or diethylcyclohexane, aromatic hydrocarbons such as toluene, xylenes, ethylbenzene or cumene, technical-grade mixtures of relatively high-boiling aromatic hydrocarbons, as commercially available under the "Solvesso" name in particular, for example Solvesso 150 or Solvesso 200, aliphatic halohydrocarbons such as dichloromethane, chloroform, tetrachloromethane, 1,1- or 1,2-dichloroethane, 1,1,1- or 1,1,2-trichloroethane, 1,1,2-trichloroethylene, tetrachloroethylene, 1,2-dichloropropane, butyl chloride, 1,1,2-trichloro-1,2,2-trifluoroethane, 1,1,1,2-tetrachloro-2,2-difluoroethane or 1,1,2,2-tetrachloro-1,2-difluoroethane, and ethers such as diethyl ether, dipropyl ether, dibutyl ether, methyl tert-butyl ether, dioxane, tetrahydrofuran, diethylene glycol dimethyl ether and mixtures of the solvents mentioned.

In precipitation polymerization and suspension polymerization, the additional use of protective colloids is, respectively, appropriate and necessary. Protective colloids are usually polymeric substances which have good solubility in the solvent used and do not enter into any reactions with the monomers. Suitable protective colloids which can be used in the preparation of (CP) are, for example, copolymers of maleic anhydride with vinyl alkyl ethers and/or olefins having 8 to 20 carbon atoms, and the monoesters thereof with C$_{10}$- to C$_{20}$-alcohols, or the mono- or diamides thereof with C$_{10}$- to C$_{20}$-alkylamines, and also polyalkyl vinyl ethers whose alkyl groups comprise 1 to 20 carbon atoms, for example polymethyl, polyethyl, polyisobutyl or polyoctadecyl vinyl ether. The amounts of protective colloids added are typically 0.05 to 4% by weight, especially 0.1 to 2% by weight, and it is often advantageous to combine a plurality of protective colloids.

The reaction equation depicted below shows, in accordance with the present invention, by way of example, the structures of a copolymer CP formed from C$_{22}$-olefin-1 and maleic anhydride ("MA") (where "MW" is the number-average molecular weight Me), the corresponding amidation product with 3-(N,N-dimethylamino)propylamine ("DM-PAP") and the corresponding quaternization product with propylene oxide ("PO")/acetic acid ("HOAc"):

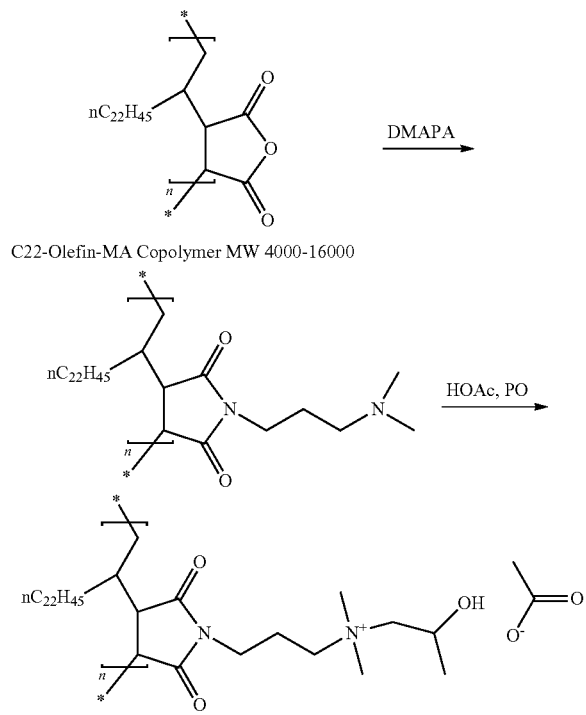

The oligoamines (OA) used in reaction step (B) preferably have a total of 2 to 4 nitrogen atoms, especially a total of 2 or 3 nitrogen atoms, in particular a total of 2 nitrogen atoms, at least one of which in each case is a quaternizable tertiary nitrogen atom.

The alcoholamines (AA) used in reaction step (B) have preferably 1 to 3 nitrogen atoms, at least one of which is a quaternizable tertiary nitrogen atom, and 1 to 3 hydroxyl groups, especially one quaternizable nitrogen atom and 1 to 3 hydroxyl groups, in particular one quaternizable tertiary nitrogen atom and one hydroxyl group. The hydroxyl groups are generally alcoholic hydroxyl groups, i.e. they are borne by an $sp^3$-hybridized carbon atom.

The oligoamines (OA) and alcoholamines (AA) used in reaction step (B) typically have a total carbon number of not more than 75, especially of not more than 50, in particular of not more than 30.

For the partial or full amidation or imidation of the carboxylic acid functions of the units (M2) in (CP) in reaction step (B), suitable oligoamines (OA) in a preferred embodiment are compounds of the general formula (Ia)

$$R^1R^2N-(CH_2)_n-NR^3R^4 \quad (Ia)$$

in which
the variables $R^1$ and $R^2$ are each hydrogen or $C_1$- to $C_{20}$-alkyl groups, where at least one of the variables $R^1$ and $R^2$ is hydrogen,
the variables $R^3$ and $R^4$ each independently denote $C_1$- to $C_{20}$-alkyl groups or, together with the nitrogen atom to which they are bonded, form a saturated, partly unsaturated or unsaturated five-membered or six-membered heterocyclic ring, and
the variable n is from 1 to 12, especially from 2 to 6, in particular 2 or 3.

For the partial or full esterification of the carboxylic acid functions of the units (M2) in (CP) in reaction step (B), suitable alcoholamines (AA) in a preferred embodiment are compounds of the general formula (Ib)

$$[HO-(CH_2)_m]_xN(R^5)_y(R^6)_z \quad (Ib)$$

in which
the variables $R^5$ and $R^6$ each independently denote $C_1$- to $C_{20}$-alkyl groups or, in the case that y=z=1, together with the nitrogen atom to which they are bonded, form a saturated, partly unsaturated or unsaturated five-membered or six-membered heterocyclic ring,
the variable m is from 1 to 12, especially from 2 to 6, in particular 2 or 3, and
the variables x, y and z are each 0, 1, 2 or 3, where the sum of x+y+z must give the value of 3.

Examples of useful $C_1$- to $C_{20}$-alkyl groups which may occur as substituents in the compounds of the general formulae (Ia) and (Ib) include methyl, ethyl, n-propyl, iso-propyl, n-butyl, isobutyl, sec-butyl, tert-butyl, n-pentyl, sec-pentyl, tert-pentyl, n-hexyl, n-heptyl, n-octyl, 2-ethylhexyl, n-nonyl, isononyl, 2-propylheptyl, n-decyl, n-dodecyl, n-tridecyl, isotridecyl, n-tetradecyl, n-hexydecyl, n-octadecyl and eicosyl. Preferably $C_1$- to $C_8$-alkyl groups occur here, especially $C_1$- to $C_4$-alkyl groups.

Examples of useful saturated, partly unsaturated or unsaturated five-membered or six-membered heterocyclic rings which may form the variables $R^3$ and $R^4$ or $R^5$ and $R^6$ together with the nitrogen atom to which are they are bonded include imidazoles, benzimidazoles, pyrazoles, imidazolines, piperazines, piperidines or pyridines.

Examples of compounds of the general formula (Ia) are 2-(N,N-dimethylamino)-ethylamine, 2-(N,N-diethylamino)ethylamine, 2-(N,N-di-n-propylamino)ethylamine, 2-(N,N-diisopropylamino)ethylamine, 2-(N,N-di-n-butylamino)ethylamine, 3-(N,N-dimethylamino)propylamine, 3-(N,N-diethylamino)propylamine, 3-(N,N-di-n-propylamino)propylamine, 3-(N,N-diisopropylamino)propylamine, 3-(N,N-di-n-butylamino)propylamine, N-(2-aminoethyl)imidazole, N-(2-aminoethyl)benzimidazole, N-(3-aminopropyl)imidazole, N-(3-aminopropyl)benzimidazole, N-methylpiperazine, N-ethylpiperazine, N-n-propylpiperazine, N-isopropylpiperazine and N-n-butylpiperazine.

Examples of the compounds of the general formula (Ib) are triethanolamine, tri-n-propanolamine, triisopropanolamine, N-methyldiethanolamine, N-methyl-di-n-propanol-amine, N-methyl-diisopropanolamine, N,N-dimethylethanolamine, N,N-dimethylpropanolamine, N,N-dimethylisopropanolamine, N-(2-hydroxyethyl)imidazole, N-(2-hydroxyethyl)benzimidazole, N-(3-hydroxypropyl)imidazole, N-(3-hydroxypropyl)-benzimidazole, N-(2-hydroxyethyl)piperidine and N-(3-hydroxypropyl)piperidine.

The amidation, imidation or esterification in reaction step (B) is typically performed in a suitable solvent or solvent mixture, for example in aliphatic and cycloaliphatic hydrocarbons such as pentane, hexane, heptane, octane, isooctane, cyclohexane, methylcyclohexane, ethylcyclohexane, dimethylcyclohexane or diethylcyclohexane, aromatic hydrocarbons such as toluene, xylenes, ethylbenzene or cumene, technical-grade mixtures of relatively high-boiling aromatic hydrocarbons, as commercially available under the "Solvesso" name in particular, for example Solvesso 150 or Solvesso 200, aliphatic halohydrocarbons such as dichloromethane, chloroform, tetrachloromethane, 1,1- or 1,2-dichloroethane, 1,1,1- or 1,1,2-trichloroethane, 1,1,2-trichloroethylene, tetrachloroethylene, 1,2-dichloropropane, butyl chloride, 1,1,2-trichloro-1,2,2-trifluoroethane, 1,1,1,2-tetrachloro-2,2-difluoroethane or 1,1,2,2-tetrachloro-1,2-difluoroethane, and ethers such as diethyl ether, dipropyl ether, dibutyl ether, methyl tert-butyl ether, dioxane, tetrahydrofuran, diethylene glycol dimethyl ether and mixtures of the solvents mentioned.

In the amidation and the esterification, the conditions are generally temperatures of 20 to 150° C., especially of 25 to 120° C.; the reaction is complete when all volatile compounds released in the reaction, such as water, hydrogen halide or alcohols, have been removed. In the case that an imide is obtained, the procedure in reaction step (B) preferably has two stages, by first performing an amidation—as described above—at temperatures of 20 to 150° C., especially of 25 to 120° C., and then heating to higher temperatures, appropriately to 120 to 250° C., especially to 150 to 200° C.; it is advisable here to use a correspondingly higher-boiling solvent or solvent mixture, such as Solvesso 150 or Solvesso 200, and/or to apply reduced pressure.

Useful quaternizing agents (QM) for reaction step (C) are in principle all compounds suitable as such. In a preferred embodiment, however, the quaternization in reaction step (C) of the at least one quaternizable tertiary nitrogen atom is effected with at least one quaternizing agent selected from epoxides, dialkyl sulfates, dialkyl sulfites, alkyl halides, arylalkyl halides, alkyl carboxylates and dialkyl carbonates.

Suitable epoxides are, for example, $C_2$-$C_{12}$-alkylene oxides such as ethylene oxide, propylene oxide, 1,2-butylene oxide, 2,3-butylene oxide, 2-methyl-1,2-propene oxide (isobutene oxide), 1,2-pentene oxide, 2,3-pentene oxide, 2-methyl-1,2-butene oxide, 3-methyl-1,2-butene oxide, 1,2-hexene oxide, 2,3-hexene oxide, 3,4-hexene oxide, 2-methyl-1,2-pentene oxide, 2-ethyl-1,2-butene oxide, 3-methyl-1,2-pentene oxide, 1,2-decene oxide, 1,2-dodecene oxide or 4-methyl-1,2-pentene oxide, and aromatic-substituted ethylene oxides such as styrene oxide or 4-methylstyrene oxide.

In the case of use of epoxides as quaternizing agents, they are preferably used in combination with protic acids, especially with $C_1$-$C_{12}$-monocarboxylic acids such as formic acid, acetic acid or propionic acid, or $C_2$-$C_{12}$-dicarboxylic acids such as oxalic acid or adipic acid; also suitable, however, are sulfonic acids such as benzenesulfonic acid or toluenesulfonic acid, or aqueous mineral acids such as sulfuric acid or hydrochloric acid.

Suitable dialkyl sulfates are preferably di($C_1$-$C_{20}$-alkyl) sulfates, especially di($C_1$-$C_4$-alkyl) sulfates such as dimethyl sulfate or diethyl sulfate. On completion of quaternization, the monoalkyl sulfates and sulfates formed as counterions can be removed, i.e. exchanged, by treatment with anion exchangers.

Suitable dialkyl sulfites are preferably di($C_1$-$C_{20}$-alkyl) sulfites, especially di($C_1$-$C_4$-alkyl) sulfites such as dimethyl sulfite or diethyl sulfite. On completion of quaternization, the monoalkyl sulfites and sulfites formed as counterions can be removed, i.e. exchanged, by treatment with anion exchangers.

Suitable alkyl halides are preferably $C_1$-$C_{20}$-alkyl fluorides, chlorides, bromides or iodides, especially $C_1$-$C_4$-alkyl fluorides, chlorides, bromides or iodides, such as methyl chloride, methyl bromide, methyl iodide, ethyl chloride, ethyl bromide or ethyl iodide. On completion of quaternization, halide anions formed as counterions can be removed, i.e. exchanged, by treatment with anion exchangers.

Suitable benzyl halides are, for example, benzyl chloride, benzyl bromide or benzyl iodide; the benzene ring of the benzyl radical may in principle also bear one or more substituents such as $C_1$-$C_4$-alkyl groups. On completion of quaternization, the halide anions formed as counterions can be removed, i.e. exchanged, by treatment with anion exchangers.

Suitable alkyl carboxylates are preferably mono- or di($C_1$-$C_{20}$-alkyl) mono- or dicarboxylates, especially mono- or di($C_1$-$C_4$-alkyl) mono- or dicarboxylates, where the parent mono- or dicarboxylic acid has 1 to 12 or 2 to 12 carbon atoms respectively, for example methyl formate or dimethyl oxalate. Similarly to the case of the epoxides, when using alkyl carboxylates as quaternizing agents, it is often advisable to use them preferably in combination with protic acids, especially with $C_1$-$C_{12}$-monocarboxylic acids such as formic acid, acetic acid or propionic acid, or $C_2$-$C_{12}$-dicarboxylic acids such as oxalic acid or adipic acid, or else sulfonic acids such as benzenesulfonic acid or toluenesulfonic acid, or aqueous mineral acids such as sulfuric acid or hydrochloric acid.

Suitable alkyl carbonates are preferably di($C_1$-$C_{20}$-alkyl) carbonates, especially di($C_1$-$C_4$-alkyl) carbonates such as dimethyl carbonate or diethyl carbonate.

The quaternization of reaction step (C)—whether it be that of the isolated oligoamines (OA) or alcoholamines (AA) or that of the (OA) or (AA) units in the already amidated, imidated or esterified copolymer (CP)—is performed by known techniques customary therefor. The conditions here are typically temperatures in the range from 15 to 180° C., especially from 20 to 150° C., and standard pressure or elevated pressure, at elevated pressure especially in the case of use of volatile quaternizing agents QM such as short-chain epoxides or alkyl halides, in which case it is appropriate to perform the quaternization reaction in a pressure vessel or autoclave. The quaternization reaction can be performed in an inert organic solvent such as toluene or xylene or in a technical-grade mixture of relatively high-boiling aromatic hydrocarbons, as commercially available under the "Solvesso" name in particular, for example in Solvesso 150 or Solvesso 200. In general, 0.1 to 1.5 equivalents, especially 0.5 to 1.25 equivalents, of quaternizing agent are used per equivalent of quaternizable tertiary nitrogen atom, where the quaternizing agent may be a single chemical compound or a mixture of different chemical compounds suitable for quaternization. In the case of additional use of protic acids, they are typically used in equimolar amounts or in an up to 2.5-fold excess to the quaternizing agent; in this case, it is possible to use a single protic acid or a mixture of different protic acids.

The inventive quaternized copolymer is outstandingly suitable as a fuel additive and can in principle be used in any fuels. It brings about a whole series of advantageous effects in the operation of internal combustion engines with fuels. The inventive quaternized copolymer is preferably used in gasoline fuels, but especially in middle distillate fuels.

The present invention therefore also provides fuels, especially middle distillate fuels, with a content of the inventive quaternized copolymer effective as an additive for achieving advantageous effects in the operation of internal combustion engines, for example of diesel engines, especially of direct-injection diesel engines, in particular of diesel engines with common-rail injection systems. This effective content (dosage) is generally 10 to 5000 ppm by weight, preferably 20 to 1500 ppm by weight, especially 25 to 1000 ppm by weight, in particular 30 to 750 ppm by weight, based in each case on the total amount of fuel.

The fuel additized with the inventive quaternized copolymer is usually a gasoline fuel or especially a middle distillate fuel, in particular a diesel fuel. The fuel may comprise further customary additives to improve efficacy and suppress wear. These include primarily customary detergent additives, carrier oils, lubricity additives, cetane number improvers, conductivity improvers, anticorrosion additives, antifoams and dehazers.

The customary detergent additives are preferably amphiphilic substances which possess at least one hydrophobic hydrocarbon radical with a number-average molecular weight ($M_a$) of 85 to 20 000 and at least one polar moiety selected from:

(Da) mono- or polyamino groups having up to 6 nitrogen atoms, at least one nitrogen atom having basic properties;
(Db) nitro groups, optionally in combination with hydroxyl groups;
(Dc) hydroxyl groups in combination with mono- or polyamino groups, at least one nitrogen atom having basic properties;
(Dd) carboxyl groups or their alkali metal or alkaline earth metal salts;
(De) sulfonic acid groups or their alkali metal or alkaline earth metal salts;
(Df) polyoxy-$C_2$- to $C_4$-alkylene moieties terminated by hydroxyl groups, mono- or polyamino groups, at least one nitrogen atom having basic properties, or by carbamate groups;
(Dg) carboxylic ester groups;
(Dh) moieties derived from succinic anhydride and having hydroxyl and/or amino and/or amido and/or imido groups; and/or
(Di) moieties obtained by Mannich reaction of substituted phenols with aldehydes and mono- or polyamines.

The hydrophobic hydrocarbon radical in the above detergent additives, which ensures the adequate solubility in the fuel, has a number-average molecular weight ($M_n$) of 85 to 20 000, preferably of 113 to 10 000, more preferably of 300 to 5000, even more preferably of 300 to 3000, even more especially preferably of 500 to 2500 and especially of 700 to 2500, in particular of 800 to 1500. As typical hydrophobic hydrocarbon radicals, especially in conjunction with the polar especially polypropenyl, polybutenyl and polyisobutenyl radicals with a number-average molecular weight $M_n$ of preferably in each case 300 to 5000, more preferably 300 to 3000, even more preferably 500 to 2500, even more especially preferably 700 to 2500 and especially 800 to 1500 into consideration.

Examples of the above groups of detergent additives include the following:

Additives comprising mono- or polyamino groups (Da) are preferably polyalkenemono- or polyalkenepolyamines based on polypropene or on high-reactivity (i.e. having predominantly terminal double bonds) or conventional (i.e. having predominantly internal double bonds) polybutene or polyisobutene having $M_n$=300 to 5000, more preferably 500 to 2500 and especially 700 to 2500. Such additives based on high-reactivity polyisobutene, which can be prepared from the polyisobutene which may comprise up to 20% by weight of n-butene units by hydroformylation and reductive amination with ammonia, monoamines or polyamines such as dimethylaminopropylamine, ethylenediamine, diethylenetriamine, triethylenetetramine or tetraethylenepentamine, are known especially from EP-A 244 616. When polybutene or polyisobutene having predominantly internal double bonds (usually in the β and γ positions) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or the abovementioned polyamines. Corresponding additives based on polypropene are described in particular in WO-A 94/24231.

Further preferred additives comprising monoamino groups (Da) are the hydrogenation products of the reaction products of polyisobutenes having an average degree of polymerization P=5 to 100 with nitrogen oxides or mixtures of nitrogen oxides and oxygen, as described in particular in WO-A 97/03946.

Further preferred additives comprising monoamino groups (Da) are the compounds obtainable from polyisobutene epoxides by reaction with amines and subsequent dehydration and reduction of the amino alcohols, as described in particular in DE-A 196 20 262.

Additives comprising nitro groups (Db), optionally in combination with hydroxyl groups, are preferably reaction products of polyisobutenes having an average degree of polymerization P=5 to 100 or 10 to 100 with nitrogen oxides or mixtures of nitrogen oxides and oxygen, as described in particular in WO-A 96/03367 and in WO-A 96/03479. These reaction products are generally mixtures of pure nitropolyisobutenes (e.g. α,β-dinitropolyisobutene) and mixed hydroxynitropolyisobutenes (e.g. α-nitro-β-hydroxypolyisobutene).

Additives comprising hydroxyl groups in combination with mono- or polyamino groups (Dc) are in particular reaction products of polyisobutene epoxides obtainable from polyisobutene having preferably predominantly terminal double bonds and $M_n$=300 to 5000, with ammonia or mono- or polyamines, as described in particular in EP-A 476 485.

Additives comprising carboxyl groups or their alkali metal or alkaline earth metal salts (Dd) are preferably copolymers of $C_2$- to $C_{40}$-olefins with maleic anhydride which have a total molar mass of 500 to 20 000 and some or all of whose carboxyl groups have been converted to the alkali metal or alkaline earth metal salts and any remainder of the carboxyl groups has been reacted with alcohols or amines. Such additives are disclosed in particular by EP-A 307 815. Such additives serve mainly to prevent valve seat wear and can, as described in WO-A 87/01126, advantageously be used in combination with customary fuel detergents such as poly(iso)buteneamines or polyetheramines.

Additives comprising sulfonic acid groups or their alkali metal or alkaline earth metal salts (De) are preferably alkali metal or alkaline earth metal salts of an alkyl sulfosuccinate, as described in particular in EP-A 639 632. Such additives serve mainly to prevent valve seat wear and can be used advantageously in combination with customary fuel detergents such as poly(iso)buteneamines or polyetheramines.

Additives comprising polyoxy-$C_2$- to $C_4$-alkylene moieties (Df) are preferably polyethers or polyetheramines which are obtainable by reaction of $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EP-A 310 875, EP-A 356 725, EP-A 700 985 and U.S. Pat. No. 4,877,416. In the case of polyethers, such products also have carrier oil properties. Typical examples of these are tridecanol butoxylates, isotridecanol butoxylates, isononylphenol butoxylates and polyisobutenol butoxylates and propoxylates and also the corresponding reaction products with ammonia.

Additives comprising carboxylic ester groups (Dg) are preferably esters of mono-, di- or tricarboxylic acids with long-chain alkanols or polyols, in particular those having a minimum viscosity of 2 $mm^2/s$ at 100° C., as described in particular in DE-A 38 38 918. The mono-, di- or tricarboxylic acids used may be aliphatic or aromatic acids, and particularly suitable ester alcohols or ester polyols are long-chain representatives having, for example, 6 to 24 carbon atoms. Typical representatives of the esters are adipates, phthalates, isophthalates, terephthalates and trimellitates of isooctanol, of isononanol, of isodecanol and of isotridecanol. Such products also have carrier oil properties.

Additives comprising moieties derived from succinic anhydride and having hydroxyl and/or amino and/or amido and/or especially imido groups (Dh) are preferably corresponding derivatives of alkyl- or alkenyl-substituted succinic anhydride and especially the corresponding derivatives of polyisobutenylsuccinic anhydride which are obtainable by reacting conventional or high-reactivity polyisobutene having $M_n$=preferably 300 to 5000, more preferably 300 to 3000, even more preferably 500 to 2500, even more especially preferably 700 to 2500 and especially 800 to 1500, with maleic anhydride by a thermal route in an ene reaction or via the chlorinated polyisobutene. The moieties having hydroxyl and/or amino and/or amido and/or imido groups are, for example, carboxylic acid groups, acid amides of monoamines, acid amides of di- or polyamines which, in addition to the amide function, also have free amine groups, succinic acid derivatives having an acid and an amide function, carboximides with monoamines, carboximides with di- or polyamines which, in addition to the imide function, also have free amine groups, or diimides which are formed by the reaction of di- or polyamines with two succinic acid derivatives. In the presence of imido moieties D(h), the further detergent additive in the context of the present invention is, however, used only up to a maximum of 100% of the weight of compounds with betaine structure. Such fuel additives are common knowledge and are described, for example, in documents (1) and (2). They are preferably the reaction products of alkyl- or alkenyl-substituted succinic acids or derivatives thereof with amines and more preferably the reaction products of polyisobutenyl-substituted succinic acids or derivatives thereof with amines. Of particular interest in this context are reaction products with aliphatic polyamines (polyalkyleneimines) such as especially ethylenediamine, diethylenetriamine, triethylenetetramine, tetraethylenepentamine, pentaethylenehexamine and hexaethyleneheptamine, which have an imide structure.

Additives comprising moieties (Di) obtained by Mannich reaction of substituted phenols with aldehydes and mono- or polyamines are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may stem from conventional or high-reactivity polyisobutene having $M_n$=300 to 5000. Such "polyisobutene Mannich bases" are described in particular in EP-A 831 141.

One or more of the detergent additives mentioned can be added to the fuel in such an amount that the dosage of these detergent additives is preferably 25 to 2500 ppm by weight, especially 75 to 1500 ppm by weight, in particular 150 to 1000 ppm by weight.

Carrier oils additionally used may be of mineral or synthetic nature. Suitable mineral carrier oils are the fractions obtained in crude oil processing, such as brightstock or base oils having viscosities, for example, from the SN 500 to 2000 class; but also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range from about 360 to 500° C., obtainable from natural mineral oil which has been catalytically hydrogenated and isomerized under high pressure and also deparaffinized). Likewise suitable are mixtures of the abovementioned mineral carrier oils.

Examples of suitable synthetic carrier oils are polyolefins (polyalphaolefins or polyinternalolefins), (poly)esters, (poly) alkoxylates, polyethers, aliphatic polyether-amines, alkylphenol-started polyethers, alkylphenol-started polyetheramines and carboxylic esters of long-chain alkanols.

Examples of suitable polyolefins are olefin polymers having $M_n$=400 to 1800, in particular based on polybutene or polyisobutene (hydrogenated or unhydrogenated).

Examples of suitable polyethers or polyetheramines are preferably compounds comprising polyoxy-$C_2$- to $C_4$-alkylene moieties which are obtainable by reacting $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group, and, in the case of the polyetheramines, by subsequent reductive amination with ammonia, monoamines or polyamines. Such products are described in particular in EP-A 310 875, EP-A 356 725, EP-A 700 985 and U.S. Pat. No. 4,877,416. For example, the polyetheramines used may be poly-$C_2$- to $C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are in particular esters of mono-, di- or tricarboxylic acids with long-chain alkanols or polyols, as described in particular in DE-A 38 38 918. The mono-, di- or tricarboxylic acids used may be aliphatic or aromatic acids; suitable ester alcohols or polyols are in particular long-chain representatives having, for example, 6 to 24 carbon atoms. Typical representatives of the esters are adipates, phthalates, isophthalates, terephthalates and trimellitates of isooctanol, isononanol, isodecanol and isotridecanol, for example di(n- or isotridecyl) phthalate.

Further suitable carrier oil systems are described, for example, in DE-A 38 26 608, DE-A 41 42 241, DE-A 43 09 074, EP-A 452 328 and EP-A 548 617.

Examples of particularly suitable synthetic carrier oils are alcohol-started polyethers having about 5 to 35, preferably about 5 to 30, more preferably 10 to 30 and especially 15 to 30 $C_3$- to $C_6$-alkylene oxide units, for example selected from propylene oxide, n-butylene oxide and isobutylene oxide units, or mixtures thereof, per alcohol molecule. Nonlimiting examples of suitable starter alcohols are long-chain alkanols or phenols substituted by long-chain alkyl in which the long-chain alkyl radical is in particular a straight-chain or branched $C_6$- to $C_{18}$-alkyl radical. Preferred examples include tridecanol and nonylphenol. Particularly preferred alcohol-started polyethers are the reaction products (polyetherification products) of monohydric aliphatic $C_6$- to $C_{18}$-alcohols with $C_3$- to $C_6$-alkylene oxides. Examples of monohydric aliphatic $C_6$-$C_{18}$-alcohols are hexanol, heptanol, octanol, 2-ethylhexanol, nonyl alcohol, decanol, 3-propylheptanol, undecanol, dodecanol, tridecanol, tetradecanol, pentadecanol, hexadecanol, octadecanol and the constitutional and positional isomers thereof. The alcohols can be used either in the form of the pure isomers or in the form of technical grade mixtures. A particularly preferred alcohol is tridecanol. Examples of $C_3$- to $C_6$-alkylene oxides are propylene oxide, such as 1,2-propylene oxide, butylene oxide, such as 1,2-butylene oxide, 2,3-butylene oxide, isobutylene oxide or tetrahydrofuran, pentylene oxide and hexylene oxide. Particular preference among these is given to $C_3$- to $C_4$-alkylene oxides, i.e. propylene oxide such as 1,2-propylene oxide and butylene oxide such as 1,2-butylene oxide, 2,3-butylene oxide and isobutylene oxide. Especially butylene oxide is used.

Further suitable synthetic carrier oils are alkoxylated alkylphenols, as described in DE-A 10 102 913.

Preferred carrier oils are synthetic carrier oils, particular preference being given to the above-described alcohol-started polyethers.

The carrier oil or the mixture of different carrier oils is added to the fuel in an amount of preferably 1 to 1000 ppm by weight, more preferably of 10 to 500 ppm by weight and especially of 20 to 100 ppm by weight.

It is also possible for the fuel to comprise further customary additives and coadditives in the amounts customary therefor. In the case of middle distillate fuels, especially diesel fuels, these are in particular cold flow improvers, lubricity improvers, corrosion inhibitors, demulsifiers, dehazers, antifoams, cetane number improvers, combustion improvers, antioxidants or stabilizers, antistats, metallocenes, metal deactivators, dyes and/or solvents. In the case of gasoline fuels, these are in particular friction modifiers, corrosion inhibitors, demulsifiers, dehazers, antifoams, combustion improvers, antioxidants or stabilizers, antistats, metallocenes, metal deactivators, dyes and/or solvents.

Suitable cold flow improvers are in principle all organic compounds which are capable of improving the flow performance of middle distillate fuels or diesel fuels under cold conditions. For the intended purpose, they must have sufficient oil solubility. In particular, useful cold flow improvers for this purpose are the cold flow improvers (middle distillate flow improvers, MDFIs) typically used in the case of middle distillates of fossil origin, i.e. in the case of customary mineral diesel fuels. However, it is also possible to use organic compounds which partly or predominantly have the properties of a wax antisettling additive (WASA) when used in customary diesel fuels. They can also act partly or predominantly as nucleators. It is, though, also possible to use mixtures of organic compounds effective as MDFIs and/or effective as WASAs and/or effective as nucleators.

The cold flow improver is typically selected from (K1) copolymers of a $C_2$- to $C_{40}$-olefin with at least one further ethylenically unsaturated monomer;
(K2) comb polymers;
(K3) polyoxyalkylenes;
(K4) polar nitrogen compounds;
(K5) sulfocarboxylic acids or sulfonic acids or derivatives thereof; and
(K6) poly(meth)acrylic esters.

It is possible to use either mixtures of different representatives from one of the particular classes (K1) to (K6) or mixtures of representatives from different classes (K1) to (K6).

Suitable $C_2$- to $C_{40}$-olefin monomers for the copolymers of class (K1) are, for example, those having 2 to 20 and especially 2 to 10 carbon atoms, and 1 to 3 and preferably 1 or 2 carbon-carbon double bonds, especially having one carbon-carbon double bond. In the latter case, the carbon-carbon double bond may be arranged either terminally ($\alpha$-olefins) or internally. However, preference is given to $\alpha$-olefins, more preferably $\alpha$-olefins having 2 to 6 carbon atoms, for example propene, 1-butene, 1-pentene, 1-hexene and in particular ethylene.

In the copolymers of class (K1), the at least one further ethylenically unsaturated monomer is preferably selected from alkenyl carboxylates, (meth)acrylic esters and further olefins.

When further olefins are also copolymerized, they are preferably higher in molecular weight than the abovementioned $C_2$- to $C_{40}$-olefin base monomer. When, for example, the olefin base monomer used is ethylene or propene, suitable further olefins are in particular $C_{10}$- to $C_{40}$-$\alpha$-olefins. Further olefins are in most cases only additionally copolymerized when monomers with carboxylic ester functions are also used.

Suitable (meth)acrylic esters are, for example, esters of (meth)acrylic acid with $C_1$- to $C_{20}$-alkanols, especially $C_1$- to $C_{10}$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol, and structural isomers thereof.

Suitable alkenyl carboxylates are, for example, $C_2$- to $C_{14}$-alkenyl esters, for example the vinyl and propenyl esters, of carboxylic acids having 2 to 21 carbon atoms, whose hydrocarbon radical may be linear or branched. Among these, preference is given to the vinyl esters. Among the carboxylic acids with a branched hydrocarbon radical, preference is given to those whose branch is in the $\alpha$-position to the carboxyl group, the $\alpha$-carbon atom more preferably being tertiary, i.e. the carboxylic acid being a so-called neocarboxylic acid. However, the hydrocarbon radical of the carboxylic acid is preferably linear.

Examples of suitable alkenyl carboxylates are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, preference being given to the vinyl esters. A particularly preferred alkenyl carboxylate is vinyl acetate; typical copolymers of group (K1) resulting therefrom are ethylene-vinyl acetate copolymers ("EVAs"), which are some of the most frequently used. Ethylene-vinyl acetate copolymers usable particularly advantageously and their preparation are described in WO 99/29748.

Suitable copolymers of class (K1) are also those which comprise two or more different alkenyl carboxylates in copolymerized form, which differ in the alkenyl function and/or in the carboxylic acid group. Likewise suitable are copolymers which, as well as the alkenyl carboxylate(s), comprise at least one olefin and/or at least one (meth)acrylic ester in copolymerized form.

Terpolymers of a $C_2$- to $C_{40}$-$\alpha$-olefin, a $C_1$- to $C_{20}$-alkyl ester of an ethylenically unsaturated monocarboxylic acid having 3 to 15 carbon atoms and a $C_2$- to $C_{14}$-alkenyl ester of a saturated monocarboxylic acid having 2 to 21 carbon atoms are also suitable as copolymers of class (K1). Terpolymers of this kind are described in WO 2005/054314. A typical terpolymer of this kind is formed from ethylene, 2-ethylhexyl acrylate and vinyl acetate.

The at least one or the further ethylenically unsaturated monomer(s) are copolymerized into the copolymers of class (K1) in an amount of preferably 1 to 50% by weight, especially 10 to 45% by weight and in particular 20 to 40% by weight, based on the overall copolymer. The main proportion in terms of weight of the monomer units in the copolymers of class (K1) therefore originates generally from the $C_2$ to $C_{40}$ base olefins.

The copolymers of class (K1) preferably have a number-average molecular weight $M_n$ of 1000 to 20 000, more preferably 1000 to 10 000 and in particular 1000 to 8000.

Typical comb polymers of component (K2) are, for example, obtainable by the copolymerization of maleic anhydride or fumaric acid with another ethylenically unsaturated monomer, for example with an $\alpha$-olefin or an unsaturated ester, such as vinyl acetate, and subsequent esterification of the anhydride or acid function with an alcohol having at least 10 carbon atoms. Further suitable comb polymers are copolymers of α-olefins and esterified comonomers, for example esterified copolymers of styrene and maleic anhydride or esterified copolymers of styrene and fumaric acid. Suitable comb polymers may also be polyfumarates or polymaleates. Homo- and copolymers of vinyl ethers are also suitable comb polymers. Comb polymers suitable as components of class (K2) are, for example, also those described in WO 2004/035715 and in "Comb-Like Polymers. Structure and Properties", N. A. Platé and V. P. Shibaev, J. Poly. Sci. Macromolecular Revs. 8, pages 117 to 253 (1974)". Mixtures of comb polymers are also suitable.

Polyoxyalkylenes suitable as components of class (K3) are, for example, polyoxyalkylene esters, polyoxyalkylene ethers, mixed polyoxyalkylene ester/ethers and mixtures thereof. These polyoxyalkylene compounds preferably comprise at least one linear alkyl group, preferably at least two linear alkyl groups, each having 10 to 30 carbon atoms and a polyoxyalkylene group having a number-average molecular weight of up to 5000. Such polyoxyalkylene compounds are described, for example, in EP-A 061 895 and also in U.S. Pat. No. 4,491,455. Preferred polyoxyalkylene compounds are based on polyethylene glycols and polypropylene glycols having a number-average molecular weight of 100 to 5000. Additionally suitable are polyoxyalkylene mono- and diesters of fatty acids having 10 to 30 carbon atoms, such as stearic acid or behenic acid.

Polar nitrogen compounds suitable as components of class (K4) may be either ionic or nonionic and preferably have at least one substituent, in particular at least two substituents, in the form of a tertiary nitrogen atom of the general formula $>NR^7$ in which $R^7$ is a $C_8$- to $C_{40}$-hydrocarbon radical. The nitrogen substituents may also be quaternized, i.e. be in cationic form. An example of such nitrogen compounds is that of ammonium salts and/or amides which are obtainable by the reaction of at least one amine substituted by at least one hydrocarbon radical with a carboxylic acid having 1 to 4 carboxyl groups or with a suitable derivative thereof. The amines preferably comprise at least one linear $C_8$- to $C_{40}$-alkyl radical. Primary amines suitable for preparing the polar nitrogen compounds mentioned are, for example, octylamine, nonylamine, decylamine, undecylamine, dodecylamine, tetradecylamine and the higher linear homologs. Secondary amines suitable for this purpose are, for example, dioctadecylamine and methylbehenylamine. Also suitable for this purpose are amine mixtures, in particular amine mixtures obtainable on the industrial scale, such as fatty amines or hydrogenated tallamines, as described, for example, in Ullmann's Encyclopedia of Industrial Chemistry, 6th Edition, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalenedicarboxylic acid, phthalic acid, isophthalic acid, terephthalic acid, and succinic acids substituted by long-chain hydrocarbon radicals.

In particular, the component of class (K4) is an oil-soluble reaction product of poly($C_2$- to $C_{20}$-carboxylic acids) having at least one tertiary amino group with primary or secondary amines. The poly($C_2$- to $C_{20}$-carboxylic acids) which have at least one tertiary amino group and form the basis of this reaction product comprise preferably at least 3 carboxyl groups, especially 3 to 12 and in particular 3 to 5 carboxyl groups. The carboxylic acid units in the polycarboxylic acids have preferably 2 to 10 carbon atoms, and are especially acetic acid units. The carboxylic acid units are suitably bonded to the polycarboxylic acids, usually via one or more carbon and/or nitrogen atoms. They are preferably attached to tertiary nitrogen atoms which, in the case of a plurality of nitrogen atoms, are bonded via hydrocarbon chains.

The component of class (K4) is preferably an oil-soluble reaction product based on poly($C_2$- to $C_{20}$-carboxylic acids) which have at least one tertiary amino group and are of the general formula IIa or IIb

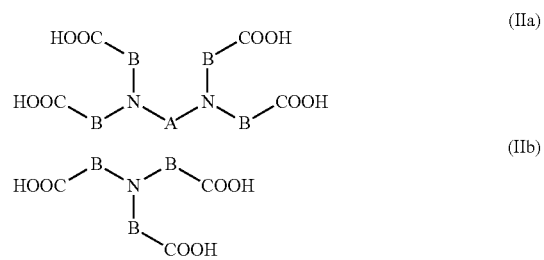

in which the variable A is a straight-chain or branched $C_2$- to $C_6$-alkylene group or the moiety of the formula III

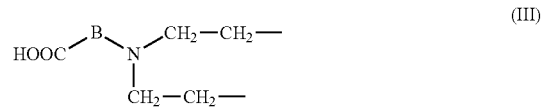

and the variable B is a $C_1$- to $C_{19}$-alkylene group. The compounds of the general formulae IIa and IIb especially have the properties of a WASA.

Moreover, the preferred oil-soluble reaction product of component (K4), especially that of the general formula IIa or IIb, is an amide, an amide-ammonium salt or an ammonium salt in which no, one or more carboxylic acid groups have been converted to amide groups.

Straight-chain or branched $C_2$- to $C_6$-alkylene groups of the variable A are, for example, 1,1-ethylene, 1,2-propylene, 1,3-propylene, 1,2-butylene, 1,3-butylene, 1,4-butylene, 2-methyl-1,3-propylene, 1,5-pentylene, 2-methyl-1,4-butylene, 2,2-dimethyl-1,3-propylene, 1,6-hexylene (hexamethylene) and in particular 1,2-ethylene. The variable A comprises preferably 2 to 4 and especially 2 or 3 carbon atoms.

$C_1$- to $C_{19}$-alkylene groups of the variable B are, for example, 1,2-ethylene, 1,3-propylene, 1,4-butylene, hexamethylene, octamethylene, decamethylene, dodecamethylene, tetradecamethylene, hexadecamethylene, octadecamethylene, nonadecamethylene and especially methylene. The variable B comprises preferably 1 to 10 and especially 1 to 4 carbon atoms.

The primary and secondary amines as a reaction partner for the polycarboxylic acids to form component (K4) are typically monoamines, especially aliphatic monoamines. These primary and secondary amines may be selected from a multitude of amines which bear hydrocarbon radicals which are optionally bonded to one another if appropriate.

These parent amines of the oil-soluble reaction products of component (K4) are usually secondary amines and have the general formula $HN(R^8)_2$ in which the two variables $R^8$ are each independently straight-chain or branched $C_{10}$- to $C_{30}$-alkyl radicals, especially $C_{14}$- to $C_{24}$-alkyl radicals. These relatively long-chain alkyl radicals are preferably straight-chain or only slightly branched. In general, the secondary amines mentioned, with regard to their relatively long-chain alkyl radicals, derive from naturally occurring fatty acid and from derivatives thereof. The two $R^8$ radicals are preferably identical.

The secondary amines mentioned may be bonded to the polycarboxylic acids by means of amide structures or in the form of the ammonium salts; it is also possible for only a portion to be present as amide structures and another portion as ammonium salts. Preferably only few, if any, free acid groups are present. The oil-soluble reaction products of component (K4) are preferably present completely in the form of the amide structures.

Typical examples of such components (K4) are reaction products of nitrilotriacetic acid, of ethylenediaminetetraacetic acid or of propylene-1,2-diaminetetraacetic acid with in each case 0.5 to 1.5 mol per carboxyl group, especially 0.8 to 1.2 mol per carboxyl group, of dioleylamine, dipalmitinamine, dicoconut fatty amine, distearylamine, dibehenylamine or especially ditallow fatty amine. A particularly preferred component (K4) is the reaction product of 1 mol of ethylenediaminetetraacetic acid and 4 mol of hydrogenated ditallow fatty amine.

Further typical examples of component (K4) include the N,N-dialkylammonium salts of 2-N',N'-dialkylamidobenzoates, for example the reaction product of 1 mol of phthalic anhydride and 2 mol of ditallow fatty amine, the latter being hydrogenated or unhydrogenated, and the reaction product of 1 mol of an alkenylspirobislactone with 2 mol of a dialkylamine, for example ditallow fatty amine and/or tallow fatty amine, the last two being hydrogenated or unhydrogenated.

Further typical structure types for the component of class (K4) are cyclic compounds with tertiary amino groups or condensates of long-chain primary or secondary amines with carboxylic acid-containing polymers, as described in WO 93/18115.

Sulfocarboxylic acids, sulfonic acids or derivatives thereof which are suitable as cold flow improvers of class (K5) are, for example, the oil-soluble carboxamides and carboxylic esters of ortho-sulfobenzoic acid, in which the sulfonic acid function is present as a sulfonate with alkyl-substituted ammonium cations, as described in EP-A 261 957.

Poly(meth)acrylic esters suitable as cold flow improvers of class (K6) are either homo- or copolymers of acrylic and methacrylic esters. Preference is given to copolymers of at least two different (meth)acrylic esters which differ with regard to the esterified alcohol. Optionally, the copolymer comprises another different olefinically unsaturated monomer in copolymerized form. The weight-average molecular weight of the polymer is preferably 50 000 to 500 000. A particularly preferred polymer is a copolymer of methacrylic acid and methacrylic esters of saturated $C_{14}$ and $C_{15}$ alcohols, the acid groups having been neutralized with hydrogenated tallamine. Suitable poly(meth)acrylic esters are described, for example, in WO 00/44857.

The cold flow improver or the mixture of different cold flow improvers is added to the middle distillate fuel or diesel fuel in a total amount of preferably 10 to 5000 ppm by weight, more preferably of 20 to 2000 ppm by weight, even more preferably of 50 to 1000 ppm by weight and especially of 100 to 700 ppm by weight, for example of 200 to 500 ppm by weight.

Suitable lubricity improvers or friction modifiers are based typically on fatty acids or fatty acid esters. Typical examples are tall oil fatty acid, as described, for example, in WO 98/004656, and glyceryl monooleate. The reaction products, described in U.S. Pat. No. 6,743,266 B2, of natural or synthetic oils, for example triglycerides, and alkanolamines are also suitable as such lubricity improvers.

Suitable corrosion inhibitors are, for example, succinic esters, in particular with polyols, fatty acid derivatives, for example oleic esters, oligomerized fatty acids, substituted ethanolamines, and products sold under the trade name RC 4801 (Rhein Chemie Mannheim, Germany) or HiTEC 536 (Ethyl Corporation).

Suitable demulsifiers are, for example, the alkali metal or alkaline earth metal salts of alkyl-substituted phenol- and naphthalenesulfonates and the alkali metal or alkaline earth metal salts of fatty acids, and also neutral compounds such as alcohol alkoxylates, e.g. alcohol ethoxylates, phenol alkoxylates, e.g. tert-butylphenol ethoxylate or tert-pentylphenol ethoxylate, fatty acids, alkylphenols, condensation products of ethylene oxide (EO) and propylene oxide (PO), for example including in the form of EO/PO block copolymers, polyethyleneimines or else polysiloxanes.

Suitable dehazers are, for example, alkoxylated phenol-formaldehyde condensates, for example the products available under the trade names NALCO 7D07 (Nalco) and TOLAD 2683 (Petrolite).

Suitable antifoams are, for example, polyether-modified polysiloxanes, for example the products available under the trade names TEGOPREN 5851 (Goldschmidt), Q 25907 (Dow Corning) and RHODOSIL (Rhone Poulenc).

Suitable cetane number improvers are, for example, aliphatic nitrates such as 2-ethylhexyl nitrate and cyclohexyl nitrate and peroxides such as di-tert-butyl peroxide.

Suitable antioxidants are, for example substituted phenols, such as 2,6-di-tert-butylphenol and 6-di-tert-butyl-3-methylphenol, and also phenylenediamines such as N,N'-di-sec-butyl-p-phenylenediamine.

Suitable metal deactivators are, for example, salicylic acid derivatives such as N,N'-disalicylidene-1,2-propanediamine.

Suitable solvents are, for example, nonpolar organic solvents such as aromatic and aliphatic hydrocarbons, for example toluene, xylenes, white spirit and products sold under the trade names SHELLSOL (Royal Dutch/Shell Group) and EXXSOL (ExxonMobil), and also polar organic solvents, for example, alcohols such as 2-ethylhexanol, decanol and isotridecanol. Such solvents are usually added to the diesel fuel together with the aforementioned additives and coadditives, which they are intended to dissolve or dilute for better handling.

Middle distillate fuels such as diesel fuels or heating oils are preferably mineral oil raffinates which typically have a boiling range from 100 to 400° C. These are usually distillates having a 95% point up to 360° C. or even higher. These may also be so-called "ultra low sulfur diesel" or "city diesel", characterized by a 95% point of, for example, not more than 345° C. and a sulfur content of not more than 0.005% by weight or by a 95% point of, for example, 285° C. and a sulfur content of not more than 0.001% by weight. In addition to the mineral middle distillate fuels or diesel fuels obtainable by refining, those obtainable by coal gasification or gas liquefaction ["gas to liquid" (GTL) fuels] or by biomass liquefaction ["biomass to liquid" (BTL) fuels] are also suitable. Also suitable are mixtures of the aforementioned middle distillate fuels or diesel fuels with renewable fuels, such as biodiesel or bioethanol.

The qualities of the heating oils and diesel fuels are laid down in detail, for example, in DIN 51603 and EN 590 (cf. also Ullmann's Encyclopedia of Industrial Chemistry, 5th edition, Volume A12, p. 617 ff.).

In addition to the use thereof in the abovementioned middle distillate fuels of fossil, vegetable or animal origin, which are essentially hydrocarbon mixtures, the inventive quaternized copolymer can also be used in mixtures of such middle distillates with biofuel oils (biodiesel). Such mixtures are also encompassed by the term "middle distillate fuel" in the context of the present invention. They are commercially available and usually comprise the biofuel oils in minor amounts, typically in amounts of 1 to 30% by weight, especially of 3 to 10% by weight, based on the total amount of middle distillate of fossil, vegetable or animal origin and biofuel oil.

Biofuel oils are generally based on fatty acid esters, preferably essentially on alkyl esters of fatty acids which derive from vegetable and/or animal oils and/or fats. Alkyl esters are typically understood to mean lower alkyl esters, especially $C_1$-$C_4$-alkyl esters, which are obtainable by transesterifying the glycerides which occur in vegetable and/or animal oils and/or fats, especially triglycerides, by means of lower alcohols, for example ethanol or in particular methanol ("FAME"). Typical lower alkyl esters based on vegetable and/or animal oils and/or fats, which find use as a biofuel oil or component thereof, are, for example, sunflower methyl ester, palm oil methyl ester ("PME"), soya oil methyl ester ("SME") and especially rapeseed oil methyl ester ("RME").

The middle distillate fuels or diesel fuels are more preferably those having a low sulfur content, i.e. having a sulfur content of less than 0.05% by weight, preferably of less than 0.02% by weight, more particularly of less than 0.005% by weight and especially of less than 0.001% by weight of sulfur.

Useful gasoline fuels include all commercial gasoline fuel compositions. One typical representative which shall be mentioned here is the Eurosuper base fuel to EN 228, which is customary on the market. In addition, gasoline fuel compositions of the specification according to WO 00/47698 are also possible fields of use for the present invention.

The inventive quaternized copolymer is especially suitable as a fuel additive in fuel compositions, especially in diesel fuels, for overcoming the problems outlined at the outset in direct-injection diesel engines, in particular in those with common-rail injection systems.

The present invention thus also provides for the use of the inventive quaternized copolymer as a fuel additive for reducing or preventing deposits in the injection systems, especially in the injectors, or direct-injection diesel engines, especially in common-rail injection systems.

In addition, the present invention therefore also provides for the use of the inventive quaternized copolymer as a fuel additive for reducing the fuel consumption of direct-injection diesel engines, especially of diesel engines with common-rail injection systems.

In addition, the present invention therefore also provides for the use of the inventive quaternized copolymer as a fuel additive for minimizing power loss in direct-injection diesel engines, especially in diesel engines with common-rail injection systems.

The examples which follow are intended to illustrate the invention without restricting it.

PREPARATION EXAMPLE

Example 1a

Preparation of a $C_{20-24}$-Olefin-1-Maleic Anhydride Copolymer

The copolymer was prepared by free-radical solution polymerization according to the teaching of EP-A 307 815. To this end, the $C_{20-24}$-olefin-1 (400 g, corresponding to 1.35 mol) was melted at 80° C. and dissolved in Solvesso 150 (400 g) at 150° C. Subsequently, di-tert-butyl peroxide (5.4 g, 0.037 mol), dissolved in Solvesso 150 (30 g), and the liquid maleic anhydride (132 g, 1.35 mol) heated in a dropping funnel heated to 70° C., were simultaneously added dropwise to the olefin solution in Solvesso 150 heated to 150° C. over the course of 5 hours. The copolymer obtained possessed a hydrolysis number (HN) of 107.4 mg KOH/g, a number-average molecular weight ($M_n$) of 1470 g/mol, a weight-average molecular weight ($M_w$) of 3290 g/mol and a polydispersity (PDI) of 2.2.

Example 1b

Imidation of the $C_{20-24}$-Olefin-1-Maleic Anhydride Copolymer

The copolymer prepared in example 1a was reacted with 3-(N,N-dimethylamino)-propylamine in a molar ratio of the carboxylic anhydride functions in the copolymer to the amine of 1:1 to give the corresponding imidated copolymer with repeat N-(3-dimethylaminopropyl)succinamide units. For this purpose, the $C_{20-24}$-olefin-1-maleic anhydride copolymer dissolved in Solvesso 150 was reacted with the abovementioned amine at 25° C. in an addition reaction. The resulting amide precipitated out of the reaction mixture after a short time. The imidation was effected at 170° C. and a pressure of 1 mbar within 2 hours.

Example 1c

Quaternization of the Imidated Copolymer with Propylene Oxide

The imidated copolymer from example 1b was reacted with propylene oxide in an equimolar ratio to the tertiary nitrogen atom in the oligoamine radical, in the presence of an equimolar amount of acetic acid. This was done by dissolving the imidated copolymer in Solvesso 150 in an autoclave, admixing with the acetic acid and heating to 130° C. Nitrogen was used to set an initial pressure of 5 bar, then the propylene oxide was metered in over the course of 20 minutes, and the mixture was stirred at 130° C. for a further 6 hours. The quaternized copolymer was obtained in quantitative yield in the form of a dark-colored solution.

Use Example

Example 2

Measurement of Power Losses in a Direct-Injection Diesel Engine

To study the influence of the inventive quaternized terpolymer on the performance of direct-injection diesel engines, the power loss was determined on the basis of the official test method CEC F-98-08. The power loss (or the power increase in the case of negative values) is a direct measure of formation or elimination of deposits in the injectors. A standard direct-injection diesel engine with a common-rail system was used.

The fuel used was a commercial diesel fuel from Halternann (RF-06-03). To artificially induce the formation of deposits at the injectors, 1 ppm by weight of zinc didodecanoate was added thereto.

The table which follows shows the results of the power loss determinations at 4000 rpm after 10 minutes and 1 hour, and the quaternized copolymer was used in the form of the solution obtained in example 1c:

| Test run No. | Fuel additive | Dosage [ppm by weight of active substance] | Power loss 10 minutes | Power loss 1 hour |
|---|---|---|---|---|
| Blank | none | — | 3.59% | 1.83% |
| with quaternized CP from ex. 1c | | 100 | 0.59% | −1.50% |
| with quaternized CP from ex. 1c | | 200 | −1.76% | −1.13% |

The invention claimed is:

1. A quaternized copolymer obtainable by the reaction steps of
   (A) copolymerization of one or more straight-chain, branched or cyclic, ethylenically unsaturated $C_2$ to $C_{100}$ hydrocarbons (monomer M1), which may bear one or more oxygen- or nitrogen-functional substituents which cannot be reacted with amines to give amides or imides or with alcohols to give esters, with one or more ethylenically unsaturated $C_3$- to $C_{12}$-carboxylic acids or $C_3$- to $C_{12}$-carboxylic acid derivatives (monomer M2), which bear one or two carboxylic acid functions and can be reacted with amines to give amides or imides or with alcohols to give esters, to give a copolymer (CP) with a number-average molecular weight $M_n$ of 500 to 20 000;
   (B) partial or full amidation or imidation or esterification of the carboxylic acid functions of the (M2) units in the copolymer (CP) by reacting them with one or more oligoamines (OA) having 2 to 6 nitrogen atoms or alcoholamines (AA), each of which comprises at least one primary or secondary nitrogen atom or at least one hydroxyl group and at least one quaternizable tertiary nitrogen atom;
   (C) partial or full quaternization of the at least one tertiary nitrogen atom in the OA or AA units with at least one quaternizing agent (QM), wherein the at least one quaternizing agent (QM) is at least one alkylene oxide;
   where the sequence of steps (B) and (C) may also be reversed, such that the partial or full amidation or imidation of esterification of the carboxylic acid functions of the (M2) units in the copolymer (CP) can be effected by reacting with the oligoamines (OA) or alcoholamines (AA) already quaternized in reaction step (C).

2. A quaternized copolymer according to claim 1, obtained by reaction steps (A), (B) and (C), wherein the monomers (M1) in reaction step (A) are selected from $C_2$- to $C_{40}$-alkenes, $C_3$- to $C_{10}$-cycloolefins, alkyl vinyl ethers having 1 to 30 carbon atoms in the alkyl group, cycloalkyl vinyl ethers having 3 to 10 carbon atoms in the cycloalkyl group and oligo- or polyisobutenes having 8 to 96 carbon atoms.

3. The quaternized copolymer according to claim 1, obtained by reaction steps (A), (B) and (C), wherein the monomers (M1) in reaction step (A) bear the polymerizable ethylenically unsaturated double bond in the α position.

4. The quaternized copolymer according to claim 1, obtained by reaction steps (A), (B) and (C), wherein the monomers (M2) in reaction step (A) are selected from acrylic acid, methacrylic acid, maleic acid, fumaric acid and itaconic acid, and the anhydrides, halides and esters thereof.

5. The quaternized copolymer according to claim 1, obtained by reaction steps (A), (B) and (C), wherein the monomer units (M1) and (M2) are present in a weight ratio of 30:70 to 70:30 in the copolymer (CP) of reaction step (A).

6. The quaternized copolymer according to claim 1, obtained by reaction steps (A), (B) and (C), wherein the oligoamines (OA) used in reaction step (B) are compounds of the general formula (Ia)

$$R^1R^2N-(CH_2)_n-NR^3R^4 \qquad (Ia)$$

in which
the variables $R^1$ and $R^2$ are each hydrogen or $C_1$- to $C_{20}$-alkyl groups, where at least one of the variables $R^1$ and $R^2$ is hydrogen,
the variables $R^3$ and $R^4$ each independently denote $C_1$- to $C_{20}$-alkyl groups or, together with the nitrogen atom to which they are bonded, form a saturated, partly unsaturated or unsaturated five-membered or six-membered heterocyclic ring, and
the variable n is from 1 to 12.

7. The quaternized copolymer according to claim 1, obtained by reaction steps (A), (B) and (C), wherein the alcoholamines (AA) used in reaction step (B) are compounds of the general formula (Ib)

$$[HO-(CH_2)_m]_xN(R^5)_y(R^6)_z \qquad (Ib)$$

in which
the variables $R^5$ and $R^6$ each independently denote $C_1$- to $C_{20}$-alkyl groups or, in the case that y=z=1, together with the nitrogen atom to which they are bonded, form a saturated, partly unsaturated or unsaturated five-membered or six-membered heterocyclic ring,
the variable m is from 1 to 12, and
the variables x, y and z are each 0, 1, 2 or 3, where the sum of x+y+z must give the value of 3.

8. A process for preparing a quaternized copolymer, which comprises:
   (A) copolymerizing one or more straight-chain, branched or cyclic, ethylenically unsaturated $C_2$ to $C_{100}$ hydrocarbons (monomer M1), which may bear one or more oxygen- or nitrogen-functional substituents which cannot be reacted with amines to give amides or imides or with alcohols to give esters, with one or more ethylenically unsaturated $C_3$- to $C_{12}$-carboxylic acids or $C_3$- to $C_{12}$-carboxylic acid derivatives (monomer M2), which bear one or two carboxylic acid functions and can be reacted with amines to give amides or imides or with alcohols to give esters, to give a copolymer (CP) with a number-average molecular weight $M_n$ of 500 to 20 000;
   (B) performing partial or full amidation or imidation or esterification of the carboxylic acid functions of the (M2) units in the copolymer (CP) by reacting them with one or more oligoamines (OA) having 2 to 6 nitrogen atoms or alcoholamines (AA), each of which comprises at least one primary or secondary nitrogen atom or at least one hydroxyl group and at least one quaternizable tertiary nitrogen atom;
   (C) partially or full quaternizing the at least one tertiary nitrogen atom in the OA or AA units with at least one quaternizing agent (QM), wherein the at least one quaternizing agent (QM) is at least one alkylene oxide;
   where the sequence of steps (B) and (C) may also be reversed, such that the partial or full amidation or imidation of esterification of the carboxylic acid functions of the (M2) units in the copolymer (CP) can be effected by reacting with the oligoamines (OA) or alcoholamines (AA) already quaternized in reaction step (C).

9. A fuel comprising 10 to 5000 ppm by weight of the quaternized copolymer according to claim 1.

10. A method for reducing or preventing deposits in the injection systems of direct-injection diesel engine in need thereof, comprising adding the quaternized copolymer according to claim 1 as a fuel additive to a fuel used by the engine.

11. A method for reducing the fuel consumption of a direct-injection diesel engine in need thereof, comprising adding the quaternized copolymer according to claim 1 as a fuel additive to a fuel used by the engine.

12. A method for minimizing power loss in direct-injection diesel engine in need thereof, comprising adding the quaternized copolymer according to claim 1 as a fuel additive to a fuel used by the engine.

13. The quaternized copolymer according to claim 1, wherein the quaternizing is performed using an alkylene oxide as quaternizing agent in the presence of an acid.

\* \* \* \* \*